(No Model.)  3 Sheets—Sheet 1.

T. F. HEMMICH.
PEDESTAL, BOX AND BEARING FOR AXLES, SHAFTS AND SPINDLES.

No. 254,970.  Patented Mar. 14, 1882.

Witnesses.

Inventor.

N. PETERS. Photo-Lithographer, Washington, D. C.

(No Model.)  3 Sheets—Sheet 2.

T. F. HEMMICH.
PEDESTAL, BOX AND BEARING FOR AXLES, SHAFTS AND SPINDLES.

No. 254,970. Patented Mar. 14, 1882.

Witnesses.

Inventor.

(No Model.) 3 Sheets—Sheet 3.

T. F. HEMMICH.
PEDESTAL, BOX AND BEARING FOR AXLES, SHAFTS AND SPINDLES.

No. 254,970. Patented Mar. 14, 1882.

Witnesses.
P. Meissner.
Harry A. King

Inventor.
Thomas F. Hemmich
per Thomas P. Kinsey
Atty

UNITED STATES PATENT OFFICE.

THOMAS F. HEMMICH, OF READING, PENNSYLVANIA, ASSIGNOR OF ONE-HALF TO JOHN G. KALBACH, OF SAME PLACE.

PEDESTAL, BOX, AND BEARING FOR AXLES, SHAFTS, AND SPINDLES.

SPECIFICATION forming part of Letters Patent No. 254,970, dated March 14, 1882.

Application filed August 27, 1881. (No model.)

*To all whom it may concern:*

Be it known that I, THOMAS F. HEMMICH, of the city of Reading, county of Berks, State of Pennsylvania, have invented a new and useful Improvement in Pedestals, Boxes, and Bearings for Car-Axles, Shafts, and Spindles, of which the following is a specification.

This invention is more particularly related to that class of bearings provided with a series of anti-friction rollers; and it consists in a novel mode of arranging the same, so that the bearing shall operate in either a horizontal or vertical position indifferently and without any sensible amount of friction.

I am aware that it is not new to reduce the friction of journal, shafting, axles, and steps by running the same upon rollers, usually termed "friction-rollers;" yet my invention so simplifies their application and reduces the cost of construction as to constitute an advance over what has preceded me in this class of bearings.

Figure 1:
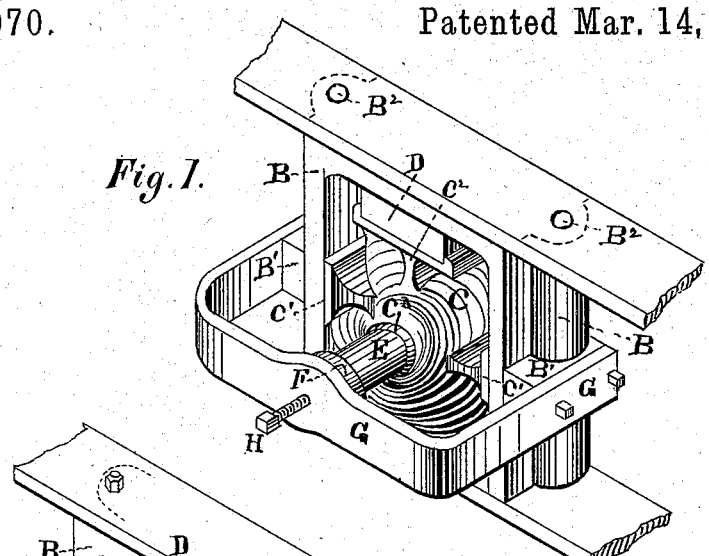
Figure 2:
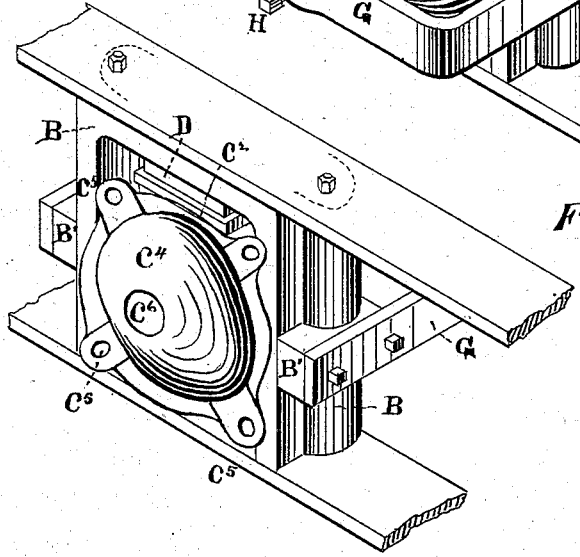
Figure 3:
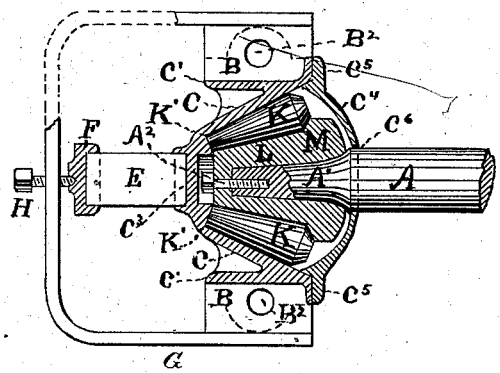
Figure 4:
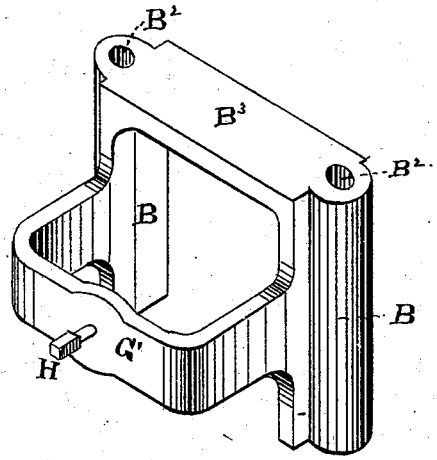
Figure 5:
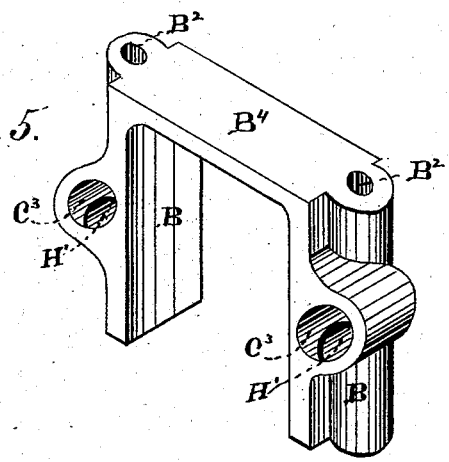
Figure 6:
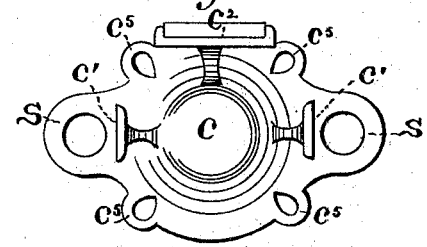
Figure 7:
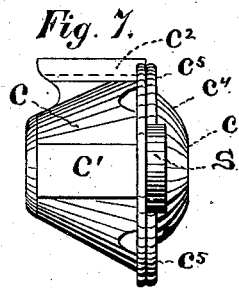
Figure 8:
Figure 9:
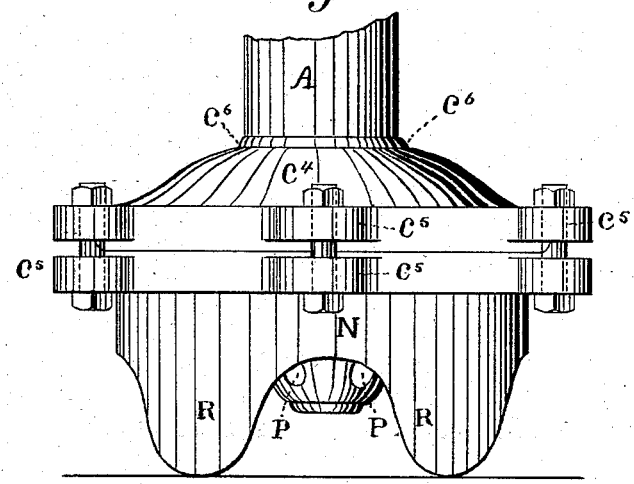
Figure 10:
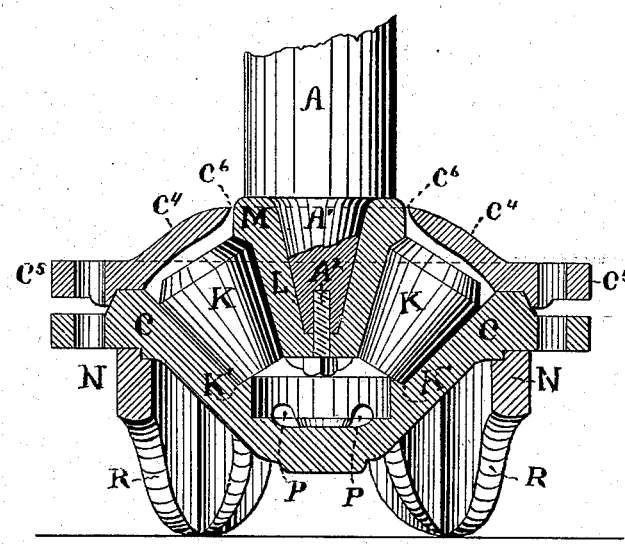

Referring to the drawings herewith, forming part of this specification, in which similar figures represent similar parts, Figure 1, Sheet 1, represents a front view of a car-axle box and pedestal showing my invention; Fig. 2, Sheet 1, a corresponding rear view; Fig. 3, Sheet 1, a sectional plan through the center of axle-bearing. Fig. 4, Sheet 2, represents a front elevation of an alternative pedestal; Fig. 5, Sheet 2, a rear elevation of a pedestal which dispenses with the yoke; Fig. 6, Sheet 2, a front elevation of the axle-box as adapted to a pedestal without a yoke; Fig. 7, Sheet 2, a side elevation of the box for a pedestal without a yoke; Fig. 8, Sheet 2, elevation of a friction-roller; Fig. 9, Sheet 3, elevation of a step-box for a spindle or upright shaft; Fig. 10, Sheet 3, sectional elevation of same.

A represents the axle, shaft, or spindle; A', a tapered reduced portion of the axle, shaft, or spindle; $A^2$, set-bolt for retention of chilled head; B, the pedestal for the axle-box; B', a pad on the pillars, used with a wrought-iron yoke; $B^2$, holes or bolts, by which the pedestals are secured in the wrought-iron truck-frames; C, the case or shell of the axle-box. The interior of the case or shell is cast upon a chill to give a hardened bearing-surface for contact with the rollers K; C', guides at the sides, sliding between the legs of the pedestal; $C^2$, seat at the top of the case for a rubber or elastic spring, D; $C^3$, seat for a rubber or elastic spring, E; $C^4$, cap or dust guard; $C^5$, ears on both case and cap, by which the two are secured or connected with bolts; $C^6$, hole in cap for the passage of the axle, shaft, or spindle; $C^7$, a hole at the base of the case, by which any dirt accidentally entering the case would be discharged; D, a rubber or elastic spring placed between the pedestal-top and seat $C^2$; E, a rubber or elastic spring placed between the case and yoke, seating in $C^3$ on the case and in a cap, F, inside of the yoke.

G is a wrought-iron yoke, secured by bolts on the pads B' and passing around the front of the case or shell C.

G' is an alternative yoke, cast with and forming part of the pedestal.

H is a set-screw passing through the yoke and centering upon the cap F.

H' are bolt-holes through seat $C^3$ on alternative pedestal, Fig. 5, Sheet 2.

K are cone-rollers, upon which the axle, shaft, or spindle has its bearing, they in turn resting upon the chilled interior of the case or shell C. They may be made of any hard metal—iron, steel, or bronze. I prefer to make them of cast-iron in special chills, so that each roller cast in the same chill shall be of uniform size and of equal hardness.

L is a chilled-iron, cast-steel, or metal shell cast upon a mandrel and within a chill, so that all cast therein shall be duplicates, and will be drawn upon the reduced end A' of the axle, shaft, or spindle A by the set-bolt $A^2$.

M is the head of the metal shell, and is usually of the diameter of the upright shaft or spindle to which it is applied; but for horizontal shafts or car-axles I make it as shown in Fig. 3, Sheet 1; N, supporting-ring cast with or bolted to the case C, to support the same when employed as a step-bearing seat, as shown in Figs. 9 and 10, Sheet 3, cut away so as to form three or more feet, R, upon which it rests.

P are dirt-discharge holes.

S are ears or caps to the springs E when the box is adapted to a pedestal without a yoke, as shown in Fig. 5, Sheet 2.

In constructing the shell and rollers I do not limit myself to any special angle for the same, although I find that for the shell interior or roller-bed an angle of about thirty degrees appears to fill all the requirements of the case. I also find that rollers of about one and one-fourth inch diameter at their small or truncated end and of about two and one-half inches diameter at the base are of ample size. The bearing may be of any desired length, the rollers being of a corresponding length upon their face. Having determined upon the size of the shell-bearing L that is to be put upon the axle, shaft, or spindle A, adding thereto two and one-half inches for the small and five inches for the large end will give the respective diameters of the inside of the shell on the bed of roller travel. Dividing the circumference of the circles thus formed by one-half of the circumference of the roller at the point of contact will determine the number of rollers to be used. In other words, for any sized roller, calling the large end of the roller B and the small end $b$, the large end of shell-bearing D and the small end $d$, then $$\frac{3.1416 \times D + B \times 2}{\frac{\text{circumference of B}}{2}} = \text{number of rollers.}$$

The rollers should fill the space between the chilled or case-hardened shell L and the seat of C, so as to work free, but not too loose. In this way the strain, whether from a vertical or horizontal direction, is equally distributed over the entire set of rollers and the roller-bed.

It will be noticed that in my arrangement of rollers their bases are so chamfered that the head M of the bearing-shell L rests in a vertical shaft or spindle fully upon the same, thus preventing any tendency to rise, which from their tapered form would occur, and the shaft or spindle would sink in the step. By my improvement the forces are balanced and the shaft or spindle remains permanently at its first adjustment, the foot step in close contact with the face of the rollers, and the head M upon the chamfered base of the same. In the horizontal arrangement as adapted to be used more particularly for car-axles the sliding forces are resisted by the yokes G or G' and elastic springs E. In practice I do not find any tendency to slide away from the bearing. The yokes, being at opposite ends of the axle, keep the forces in balance, the box being free to move in the pedestal; and the seating D at the top of the box, being elastic, relieves the box from vertical jars, while the springs E relieve it from the effects of side-thrusts.

The advantages to be derived from the use of my improvement are manifold.

First. The axles, after being turned to fit the interior of the chilled cast-iron, hardened steel, or metal shell-bearings L, are prepared for a lengthened and indefinite term of wear, governed solely by the abrasion of the wheel-bearings in jacking off and on; the wheels fitted and unfitted for use. Under the present system, when the journals of the axles become worn, (the wheels still in good condition,) the axle is put in the lathe and the journal or bearing trued up; or, if the journals are worn too much for repair, the wheels are jacked off and new ends welded upon the axle; or it is cut up and reworked as scrap. With my improvement the shell-bearing L is removed from the end A' and a new one substituted, occupying but a few minutes to make the change, when the car is ready for use, and the bearings in as good condition as when originally fitted up. The rollers are also as easily replaced when worn, and, if necessary, a new box can be substituted for an old or broken one as quickly as with any of the axle-boxes at present in use.

Second. The wear is less than with any box of which I have knowledge, owing to the contact-surfaces being chilled or case-hardened. For instance, a foot-step similar to Fig. 10, Sheet 3, in a fire-brick grinder exposed to the effect of the dust of ground fire-brick and the strain of crushing the same, after one year's constant service has not worn off the skin-surface of the casting.

Third. The economy is apparent. The wearing-surfaces, preferably of chilled cast-iron, will operate together without any lubrication, and may be driven at a speed far exceeding anything attained by our present railway-cars without heating or anxiety as to the ability to sustain such speed. The shell L and rollers K filling the case C, and the jars cushioned by the springs D and E, there cannot be the excessive wear and tear, side-thrusts, and vertical jolts experienced under the present arrangement of axle-bearings and boxes for the same. To the above must be added the economy of construction, the work being all completed (with the exception of the flange-faces and bolts) on leaving the foundry, the style of pedestal to which I give preference (shown in Fig. 4, Sheet 2) requiring only the tapping for set screw H of the yoke G' to prepare it for the truck-frames.

Fourth. Duplicate shells L being provided at the repair-shops and carried upon the trains, a car need not be thrown out of service longer than it would require to remove the box and old shell and replace the same with new.

Fifth. The fact that the box requires no lubrication peculiarly fits it for use upon the elevated railroads of cities, where the dripping of grease upon the pavement and pedestrians below is a continual grievance. When first operated a small quantity of graphite or black lead is placed in the box, which fills any inequalities which may exist and makes smooth running from the start.

Should it be considered preferable to use a lubricator, the dirt-discharge hole $C^7$ is closed. Oil may then be introduced to the height of the lower edge of the axle-opening $C^6$ in the cap $C^4$. Each roller, as it is carried around the roller-bed, will then carry with it over the shell-bearing L a certain amount of the lubricating material.

To meet objections which may be made to the yoke, I give an alternative design, Fig. 5, Sheet 2, in which no yoke is used, placing the end-thrust springs E between the box C and pedestal B, removing from the front of the case C the spring-seat C³, and placing ears S at the flange of the case to cover and secure the springs E in their new position.

Figs. 1 and 2, Sheet 1, show the adaptation of my axle-box to the ordinary pedestal of the wrought-iron truck-frames, a wrought-iron yoke being carried around the front of the box and secured by bolts to a pad cast upon the pillars of the pedestal, a set-screw, H, being tapped to press upon the spring-cap F of the spring E.

The above remarks as to economy of wear and construction, and ease of making repairs, and non-lubrication will apply to the use of my improved box as a step or bearing for vertical shafts or mill-spindles.

Having described my improvement, its construction, operation, and advantages, I desire to secure by Letters Patent the following claims:

1. The pedestal B³ of Fig. 4, adapted to be used as a car-truck pedestal, and in combination therewith a yoke, G', cast with and forming an integral part of the jaws thereof, and having a set-bolt, H, substantially as shown, and for the purpose described.

2. The combination of pedestal B³ of Fig. 4 with an anti-friction axle-box case, C, by the sliding lugs C', seat C², and spring D, and with the yoke G' by seat C³, spring E, cap F, and set-bolt H, substantially as shown, and for the purpose set forth.

3. The axle-box case or seating C, provided with interior chilled wearing-surface, exterior lug-slides, C', vertical spring-seat C², end-thrust spring-seat C³, cap C⁴, ears C⁵, opening in cap C⁶, and dirt-discharge C⁷, substantially as shown, and for the purpose specified.

4. The chilled bearing-shell L, provided with head or collar M, its interior adapted, by casting upon a mandrel within a chill, to be fitted upon the end A' of the axle, shaft, or spindle A, and to be retained upon the end of the same by the set-bolt A², substantially as shown, and for the purpose described.

5. The chilled anti-friction rollers K, adapted, by a bevel-chamfer at their base, to contact with the head or collar M of the shell-bearing L, the rollers being so arranged and combined with the case C and shell-bearing L that the thrust or weight of the axle, shaft, or spindle A shall be distributed upon the collar M, the chilled bed of the case C, and the roller guide-ledge K' at truncated end of the case, substantially as described, and for the purpose specified.

6. The combination of case C with the anti-friction rollers K, shell-bearing L, axle, shaft, or spindle A, and pedestal B', substantially as described, shown, and for the purpose specified.

7. The combination of the chilled friction-rollers K with the chilled surface of the case C, and of the chilled shell-bearing L upon the axle, shaft, or spindle A, substantially as shown, and for the purpose described.

8. The combination of the chilled shell-bearing L, having the head M, with the axle, shaft, or spindle A by the reduced portion A', and with the interior chilled surface of the case C by the chilled anti-friction rollers K, substantially as shown, and for the purpose specified.

9. The drum-support N, cut away to form feet R, in combination with the case C, as adapted for a step to a vertical shaft or spindle, A, substantially as shown, and for the purpose set forth.

10. In combination with a vertical shaft or spindle, A, the case C, supported upon the drum N, cast therewith or bolted thereto, and having its interior surface chilled and filled with chilled anti-friction roller K, forming a seat and bearing for the toe L of the spindle A, the toe L being a chilled or case-hardened casting secured to the spindle or shaft by the set-bolt A², substantially as described, shown, and for the purpose specified.

THOS. F. HEMMICH.

Witnesses:
W. C. HEACOCK,
AMOS BERNE,
ABNER K. STAUFFER.